US008751774B2

(12) United States Patent
Yang et al.

(10) Patent No.: US 8,751,774 B2
(45) Date of Patent: Jun. 10, 2014

(54) METHOD AND SYSTEM FOR CONTROLLING MESSAGE TRAFFIC BETWEEN TWO PROCESSORS

(75) Inventors: Wan-ping Yang, Farmington Hills, MI (US); Koji Shinoda, Farmington Hills, MI (US); Hiroaki Shibata, Novi, MI (US)

(73) Assignees: DENSO International America, Inc., Southfield, MI (US); Denso Corporation, Kariya-shi, Aichi-ken (JP)

( * ) Notice: Subject to any disclaimer, the term of this patent is extended or adjusted under 35 U.S.C. 154(b) by 700 days.

(21) Appl. No.: 13/077,689

(22) Filed: Mar. 31, 2011

(65) Prior Publication Data
US 2012/0254596 A1 Oct. 4, 2012

(51) Int. Cl.
*G06F 9/30* (2006.01)
*G06F 9/38* (2006.01)

(52) U.S. Cl.
CPC .............. *G06F 9/30* (2013.01); *G06F 9/30076* (2013.01)
USPC ............................................ 712/34; 712/220

(58) Field of Classification Search
CPC ........................................................ G06F 9/30
See application file for complete search history.

(56) References Cited

U.S. PATENT DOCUMENTS

| 5,724,558 | A | * | 3/1998 | Svancarek et al. ............... 703/21 |
| 8,115,949 | B2 | * | 2/2012 | Toda ............................. 358/1.15 |
| 8,190,862 | B2 | * | 5/2012 | Benayoun et al. ............ 712/220 |
| 8,548,607 | B1 | * | 10/2013 | Belz et al. ........................ 700/21 |
| 2001/0015817 | A1 | * | 8/2001 | Adachi ........................ 358/1.13 |
| 2004/0263870 | A1 | * | 12/2004 | Itoh et al. ........................ 358/1.1 |
| 2005/0278519 | A1 | * | 12/2005 | Luebke et al. .................... 713/1 |
| 2006/0044594 | A1 | * | 3/2006 | Shirai .......................... 358/1.14 |
| 2007/0081186 | A1 | * | 4/2007 | Numata ....................... 358/1.15 |
| 2008/0077717 | A1 | * | 3/2008 | Okutsu ........................... 710/40 |
| 2009/0132796 | A1 | * | 5/2009 | Snyder et al. ................. 712/229 |
| 2009/0168760 | A1 | * | 7/2009 | Katis et al. ..................... 370/352 |
| 2009/0201535 | A1 | * | 8/2009 | Nagao et al. ................. 358/1.15 |

* cited by examiner

*Primary Examiner* — Eric Coleman
(74) *Attorney, Agent, or Firm* — Harness, Dickey & Pierce, P.L.C.

(57) ABSTRACT

A system and method for controlling messaging between a first processor and a second processor is disclosed. The second processor controls one or more peripheral devices on behalf of a plurality of predetermined tasks being executed by the first processor. The system includes a message control module that receives an input message intended for the second processor from the first processor and maintains a message history based on the received input message and previously received input messages. The message history indicates which peripheral devices of the system are to be on and which tasks of the plurality of tasks requested the peripheral devices to be on. The message control module is further configured to generate an output message that includes output instructions for the second processor based on the message history and an output duration based on the message history. The second processor executes the output instructions.

15 Claims, 9 Drawing Sheets

MEthod and system for controlling message traffic between two processors

FIELD

The present disclosure relates to a system and method for controlling message traffic between a first processor and a second processor.

BACKGROUND

Many devices or systems are comprised of more than one processor which communicate serially with one another. For instance, a telematics device may include two processors in serial communication with another. Similarly, the processors in a computing system may communicate serially with each other. In these configurations, a first processor may perform a plurality of applications such as performing communications, controlling the GPS, controlling the audio visual system, or other resource intensive applications. A second processor may manage components of the device in supporting the first processor. For instance, the second processor may handle I/O signals from peripherals devices or control peripheral devices on behalf of the first processor.

Typically, the second processor is a low-power processor and receives instructions in the form of messages from the first processor. One issue that arises is that the first processor may communicate multiple messages to the second processor with only milliseconds interposed between the messages. These messages will include durations indicating an amount of time that the second processor should perform the requested function, e.g., turn mute on for 10 seconds. These durations will often exceed the amount of time between two or more consecutive messages. Because the second processors are typically low-power and not as computationally capable as the first processor, an earlier message will be overridden by a later message if received before the duration of the earlier message expires. Thus, there is a need for message design that allows for more efficient and accurate communication between a high end processor and a low end processor.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

In one aspect, a system configured to control messaging traffic between a first processor and a second processor is disclosed. The first processor is configured to perform a plurality of predetermined tasks. Each task is assigned a unique task identifier. The first processor is further configured to generate an input message on behalf of one of the plurality of tasks. The input message includes input instructions for the second processor for controlling one or more peripheral devices of the system and an input duration indicating a minimum amount of time that the input instructions to the second processor are to be executed. The system further includes a message control module that is configured to receive an input message intended for the second processor from the first processor and to maintain a message history based on the received input message and previously received input messages. The message history indicates which peripheral devices of the system are to be on, and which tasks of the plurality of tasks requested the peripheral devices to be on. The message control module is further configured to generate an output message that includes output instructions for the second processor based on the message history and an output duration based on the message history. The second processor is configured to receive the output message and to execute the output instructions for an amount of time corresponding to the output duration.

In another aspect of the disclosure a method for controlling message traffic between a first processor and a second processor is disclosed. The second processor controls one or more peripheral devices on behalf of a plurality of predetermined tasks being executed by the first processor. The method comprises receiving an input message originating from one of the plurality of tasks executing on the first processor intended for the second processor. The input message includes input instructions for the second processor for controlling one or more of the peripheral devices and an input duration indicating a minimum amount of time that the input instructions to the second processor are to be executed. The method further comprises maintaining a message history based on the received input message and previously received input messages. The message history indicates which peripheral devices of the system are to be on and which tasks of the plurality of tasks requested the peripheral devices to be on. The method includes generating an output message that includes output instructions for the second processor based on the message history and an output duration based on the message history. The method further comprises transmitting the output message to the second processor.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

A method and system for efficient communication between a first and second processor is herein described. The system includes a communication traffic module that receives serial messages from the first processor intended for the second processor and aggregates the instructions from the messages for the second processor into an output message.

Figure 1:
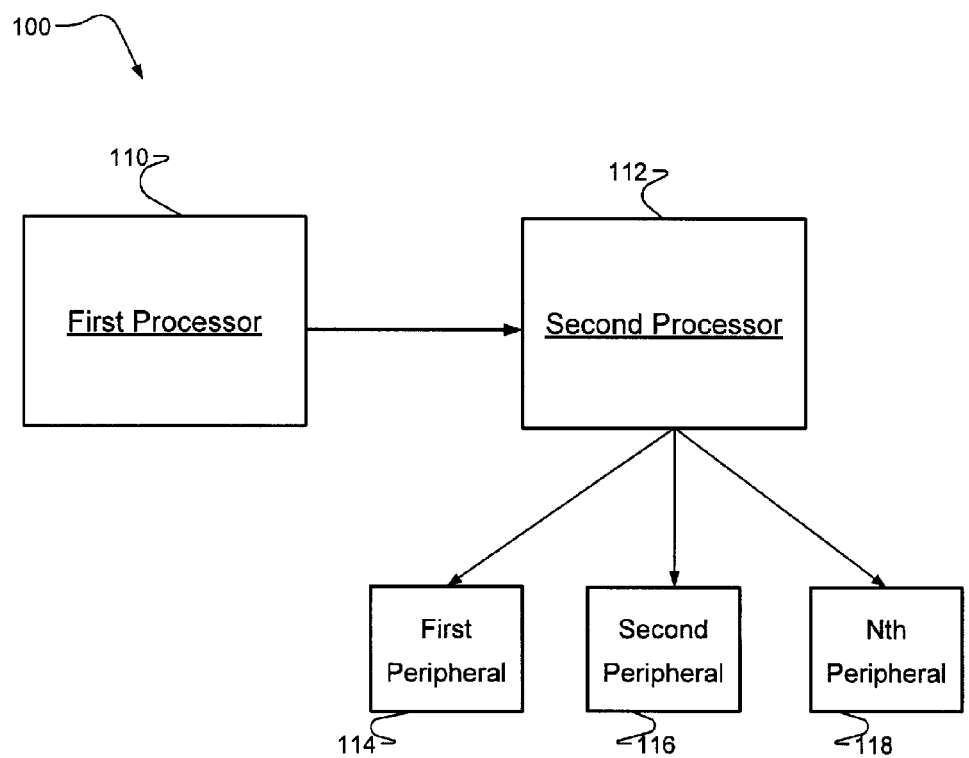
FIG. 1 is a component diagram illustrating an exemplary system having a first and second processor.

FIG. 1 illustrates an exemplary system 100. It is appreciated that the system may be incorporated in a single device or over a plurality of devices. For instance, the system 100 may be a device having a first processor 110 in communication with a second processor 112 or a first device having a first processor 110 in communication with a second device having a second processor 112. The second processor 112 is configured to control a first peripheral device 114, a second peripheral device 116, and up to an Nth peripheral device 118. It is noted that the term peripheral devices includes any component of a device or system that is controlled by the second processor 112.

In some embodiments, the first processor 110 is a high end processor and the second processor is a low end processor. For instance, in a telematics device, the first processor may be used for executing applications, processing GPS signals, and performing CDMA communication. The low-end processors in a telematics device can be configured to handle external I/O signals, control the power management peripheral devices, and to control other peripheral devices of the telematics devices such as a microphone, speakers, and LEDs. The high end processors will typically be more expensive and require more power than the low end processors. It is appreciated that the following disclosure can apply to a wide range of systems and devices and is not limited to a telematics device. For instance, the first processor 110 can be the processor of a first computer and the second processor 112 can be the processor of a second computer, wherein the second computer is a slave of the first computer.

The first processor 110 will execute one or more tasks. Tasks are any function of the system that the first processor 110 is responsible for performing. For instance, in the example of a telematics device, tasks may include controlling the display of the telematics device, controlling the audio system of the telematics device, and controlling the GPS of the telematics device. In order to effectuate the tasks, the first processor 110 will instruct the second processor 112 to execute specific instructions. For instance, the first processor 110 may instruct the second processor to turn power on, to suppress resets, to mute the speaker system, and to turn on an LED, such that the task requires the foregoing state be set for a specific duration. These instructions are combined into a single message. The following illustrates an exemplary structure of a message:

```
Message_Format{
Byte 0: Message ID
Byte 1: UART wakeup
Byte 2: Reset suppression
Byte 3: Mute Status
Byte 4: LED Status
Byte 5: Duration of Message
}
```

It is appreciated that the following structure is an example of a message format and any other suitable message format is applicable.

Figure 2:
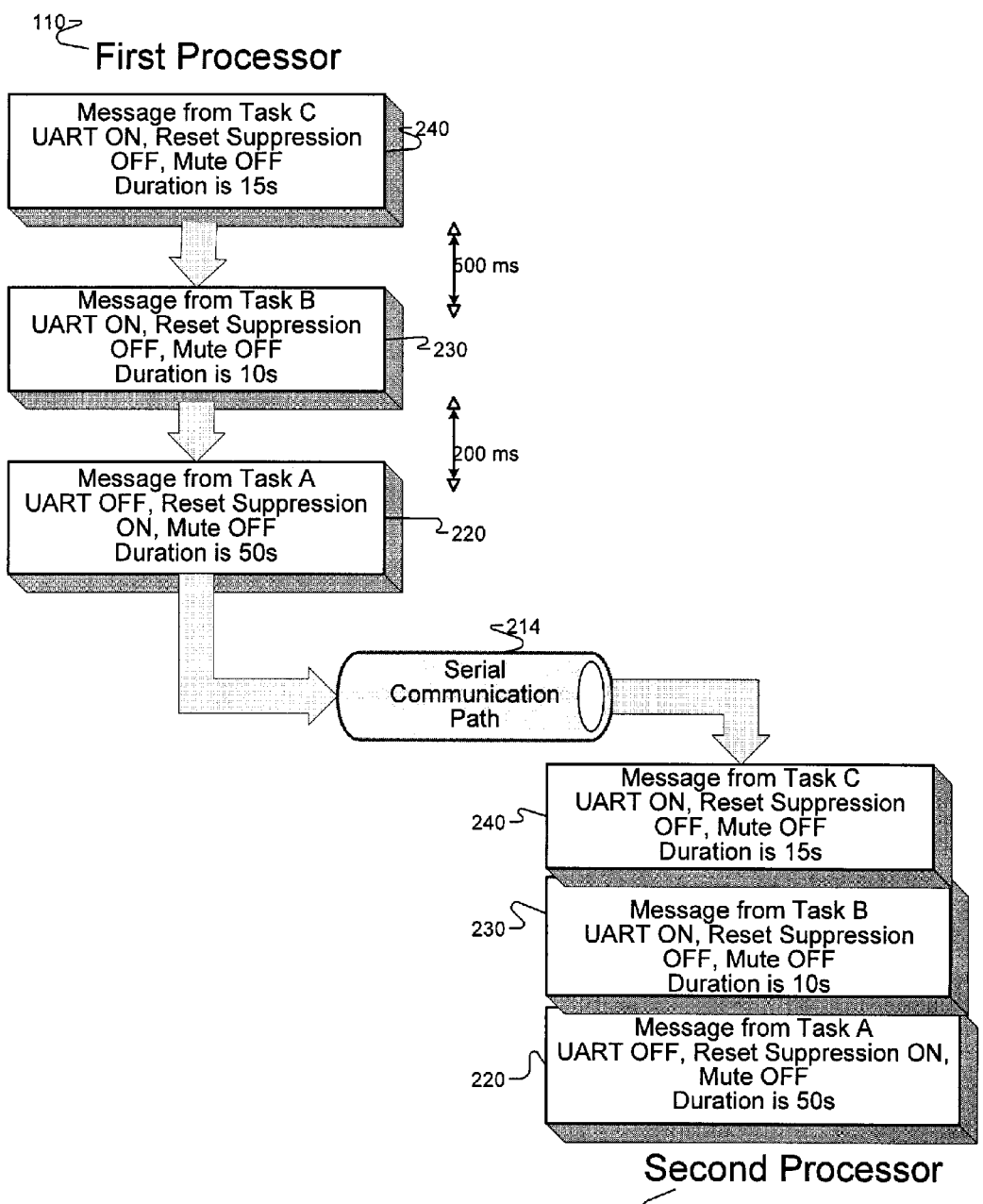
FIG. 2 is a drawing illustrating an example of messages being communicated from a first processor to a second processor with message traffic control.

The first processor 110, in performing various tasks of different applications will generate different messages to the second processor 112. The second processor 112 will receive and execute the instruction. FIG. 2 illustrates an example of serial communications without message traffic control. In the example, the first processor 110 is transmitting three messages 220, 230, 240 to the second processor 112 over a communication path 214, e.g. a bus, a wireless communication link, or a wired communication link. In the example, Message A 220 is sent from the first processor 110 to the second processor 112 as part of a Task A. Message B 230 is sent 200 ms later, as part of a Task B. Message C 240 is sent 500 ms later as part of a Task C. Message A 220 requests that the UART be set to OFF, that reset suppression be set to ON, and mute be set to OFF, and that the message have a duration of 50 seconds. Message B 230 requests that the UART be set to ON, that reset suppression be set to OFF, and mute be set to OFF, and that the message have a duration of 10 seconds. Message C 240 requests that the UART be set to ON, that reset suppression be set to OFF, and mute be set to OFF, and that the message have a duration of 10 seconds. Without message traffic control, Message A 220 is received 700 ms before Message C 240 and Message C 240 will be executed upon being received by the second processor 112. Thus, the reset suppression will be set to OFF, despite Task A requiring reset suppression to be off for at least 50 seconds.

Figure 3A:
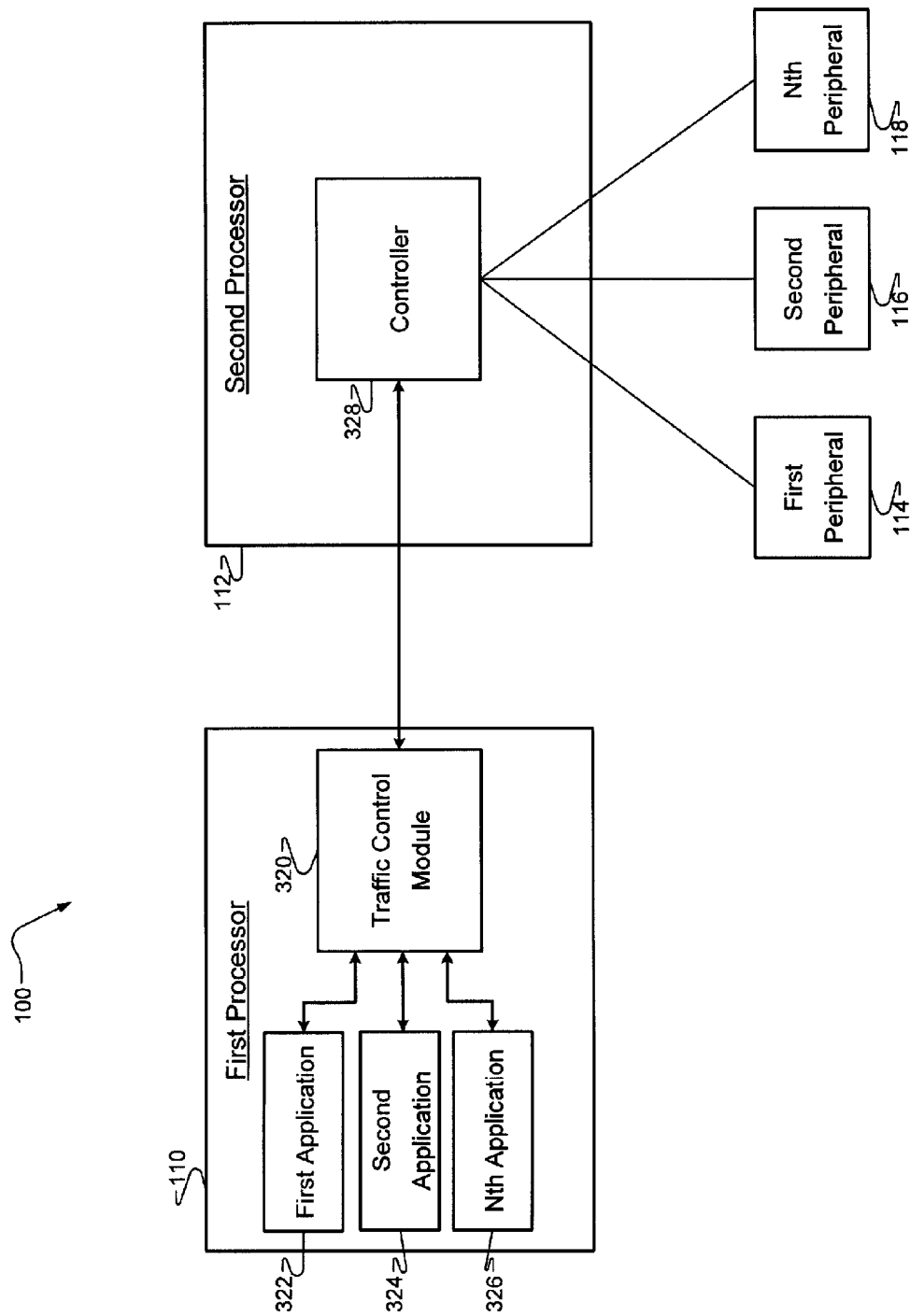
FIGS. 3A-D are component diagrams illustrating exemplary embodiments of a system having a traffic control module that controls traffic between a first processor and a second processor.
Figure 3B:
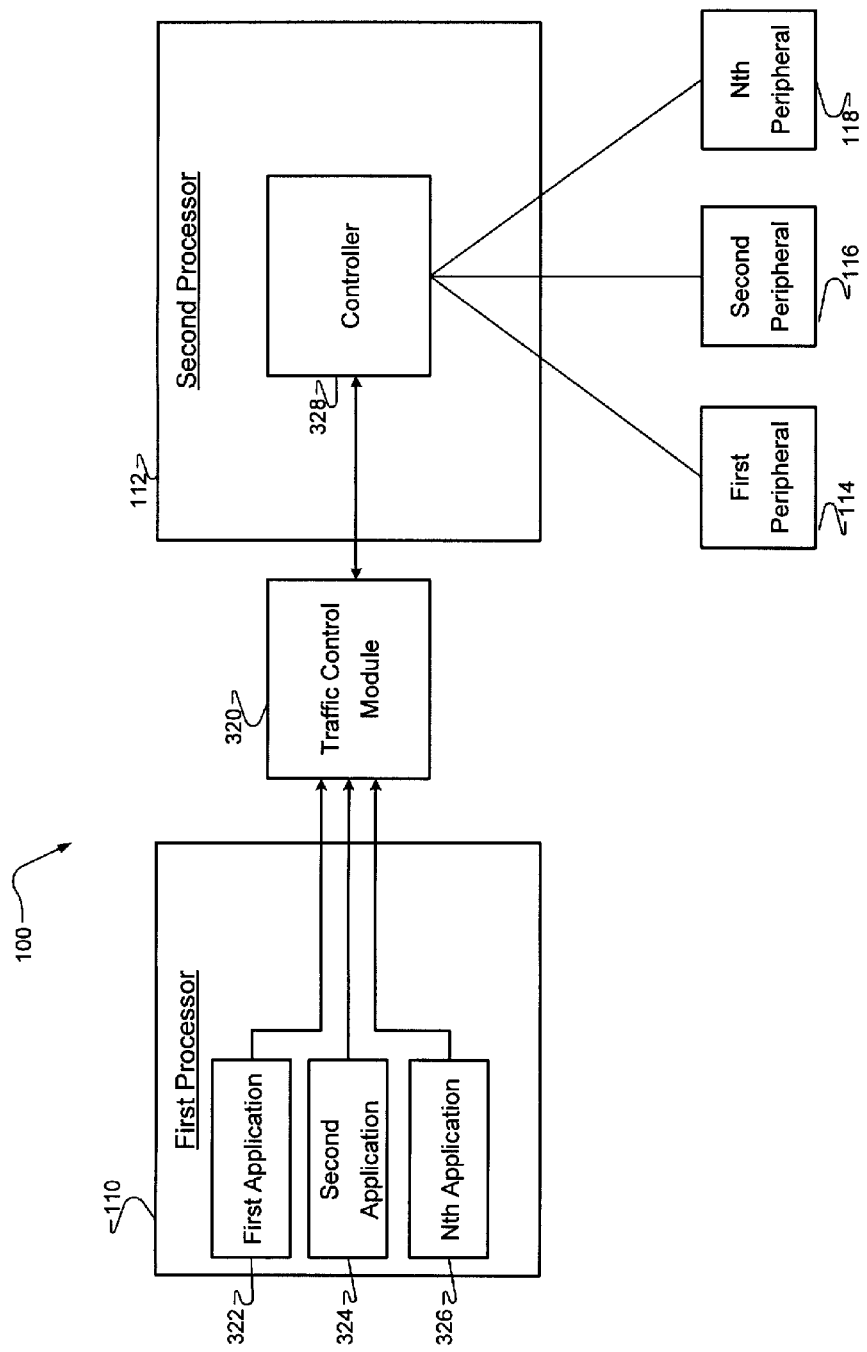
Figure 3C:
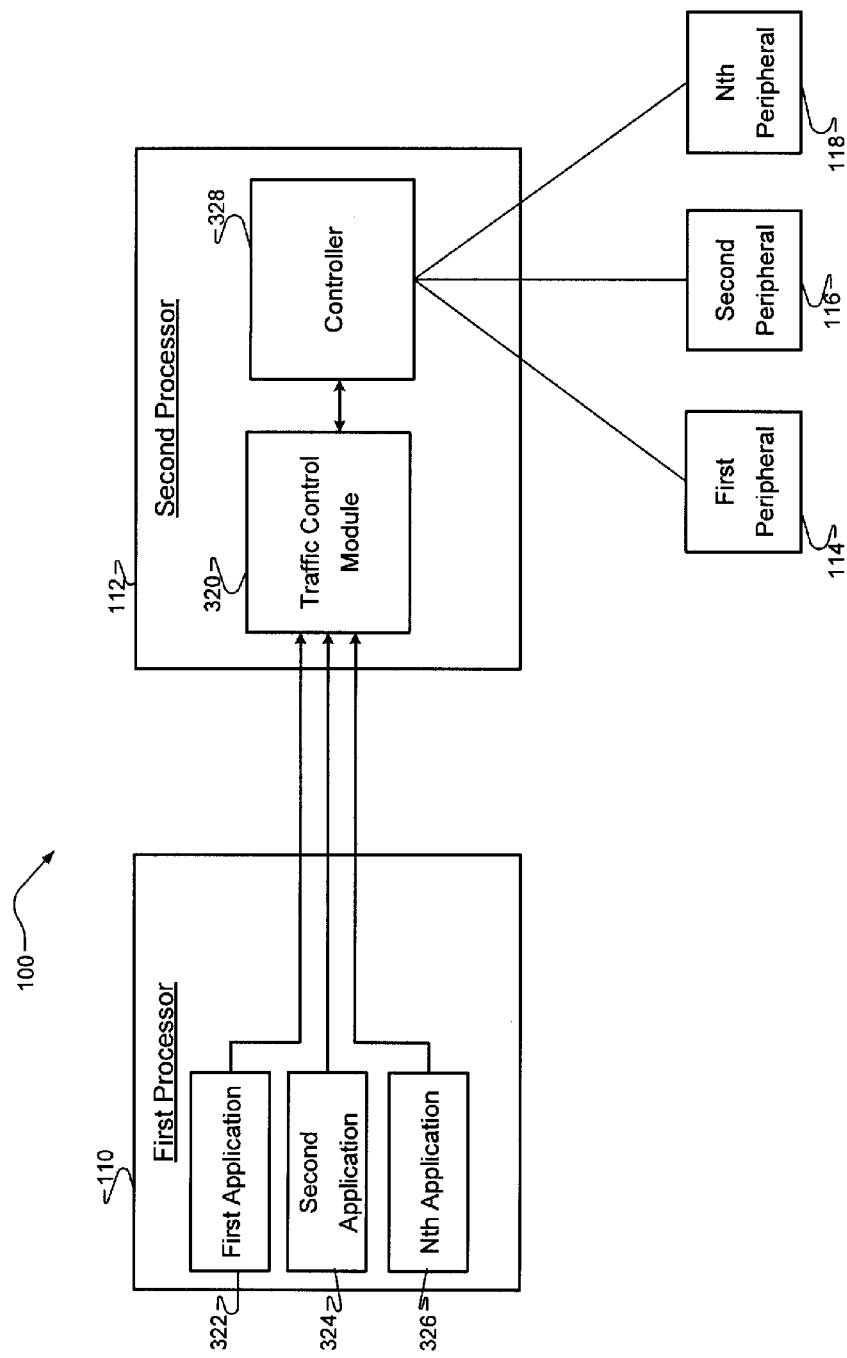

To resolve issues with message traffic control, messages from the first processor 110 to the second processor 112 will be aggregated by a traffic control module. FIGS. 3A-3C illustrate exemplary configurations of a system 100 having a traffic control module 320. In FIG. 3A the traffic control module 320 is integrated on the first processor 110. The first processor 110 is executing a first application 322, a second application 324, and up to an Nth application 326. Each application is performing one or more predetermined tasks, where each predetermined task has an identifier. When a task of an application requires one or more of the peripheral devices 114, 116, and 118 to be turned on, the application will generate a message to send to the second processor 112. The second processor 112 includes a controller 328 that receives the messages having sets of instructions and controls the peripherals 114, 116, and 118 based on the instructions. Based on the instructions, the controller 328 will turn a peripheral on or off.

Before the controller 328 receives a message from a task, the instruction is received by the traffic control module 320. The traffic control module 320 analyzes the instructions contained in the message and maintains a message history that tracks which tasks have requested which specific peripherals are to be turned on or are to remain on. Based on the message history, an output message is sent to the controller 328 of the second processor 112.

In FIG. 3B, the traffic control module 320 is integrated on a dedicated microprocessor (not shown). The traffic control module 320 operates in a similar manner as described above. In FIG. 3C, the traffic control module 320 is integrated on the second processor 112, and operates in a similar manner as described above.

Figure 3D:
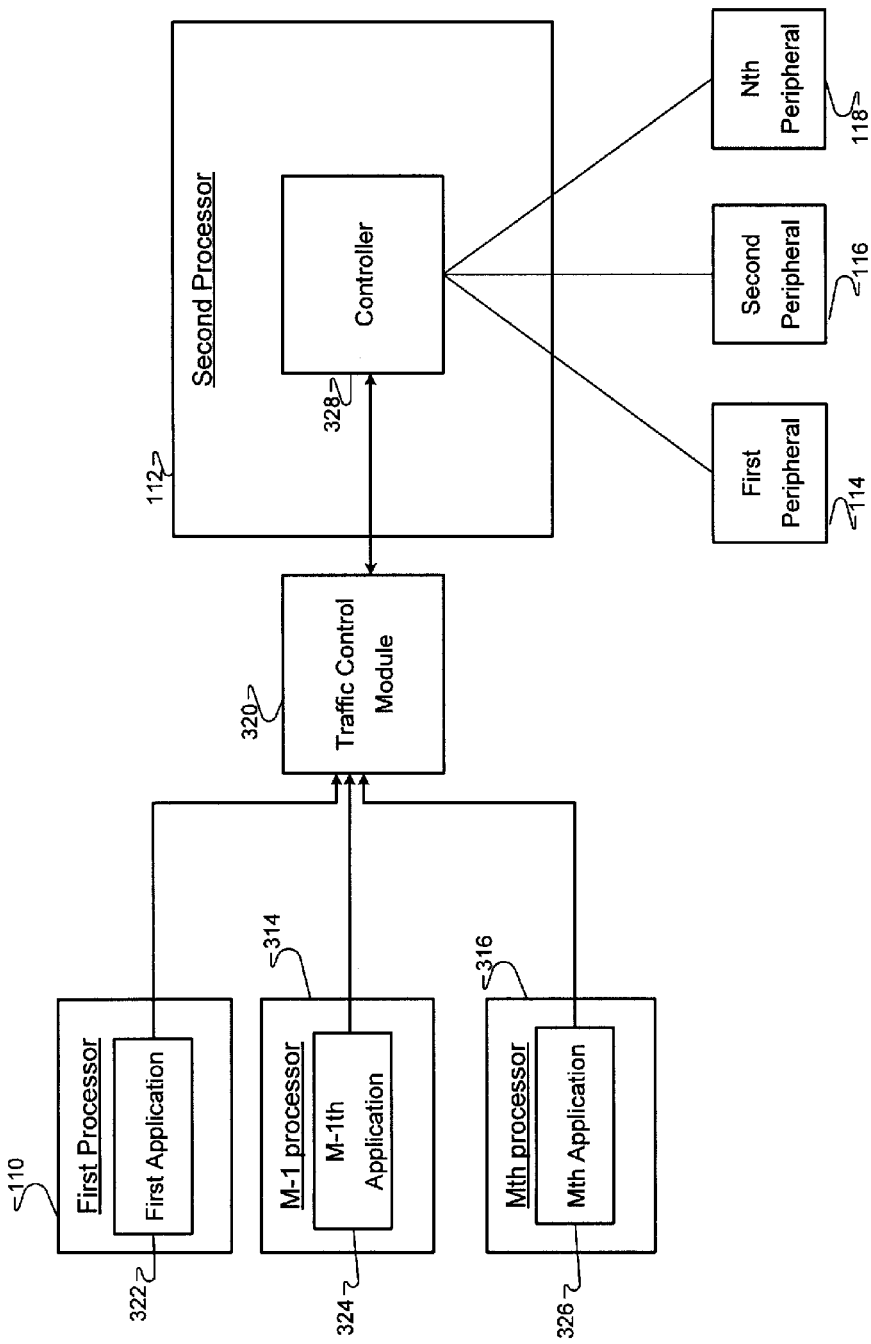

In FIG. 3D, the traffic control module 320 is integrated on a dedicated microprocessor (not shown) and facilitates message traffic sent to the second processor 112 from M different processors 110, 312, and 314 executing M applications 322, 324, and 326. In this example, the traffic control module 320 receives messages from each of the processors 110, 312, and 314 and maintains a message history that tracks which tasks have requested which specific peripherals are to be turned on or are to remain on. It is appreciated that the traffic control module 320 can receive messages from a varying amount of processors, applications and tasks. Further, it is appreciated in such configurations, the processors 111, 112, 312, and 314 may be distributed throughout a plurality of devices or computers, such that the processors are communicating over a communications network.

Figure 4:
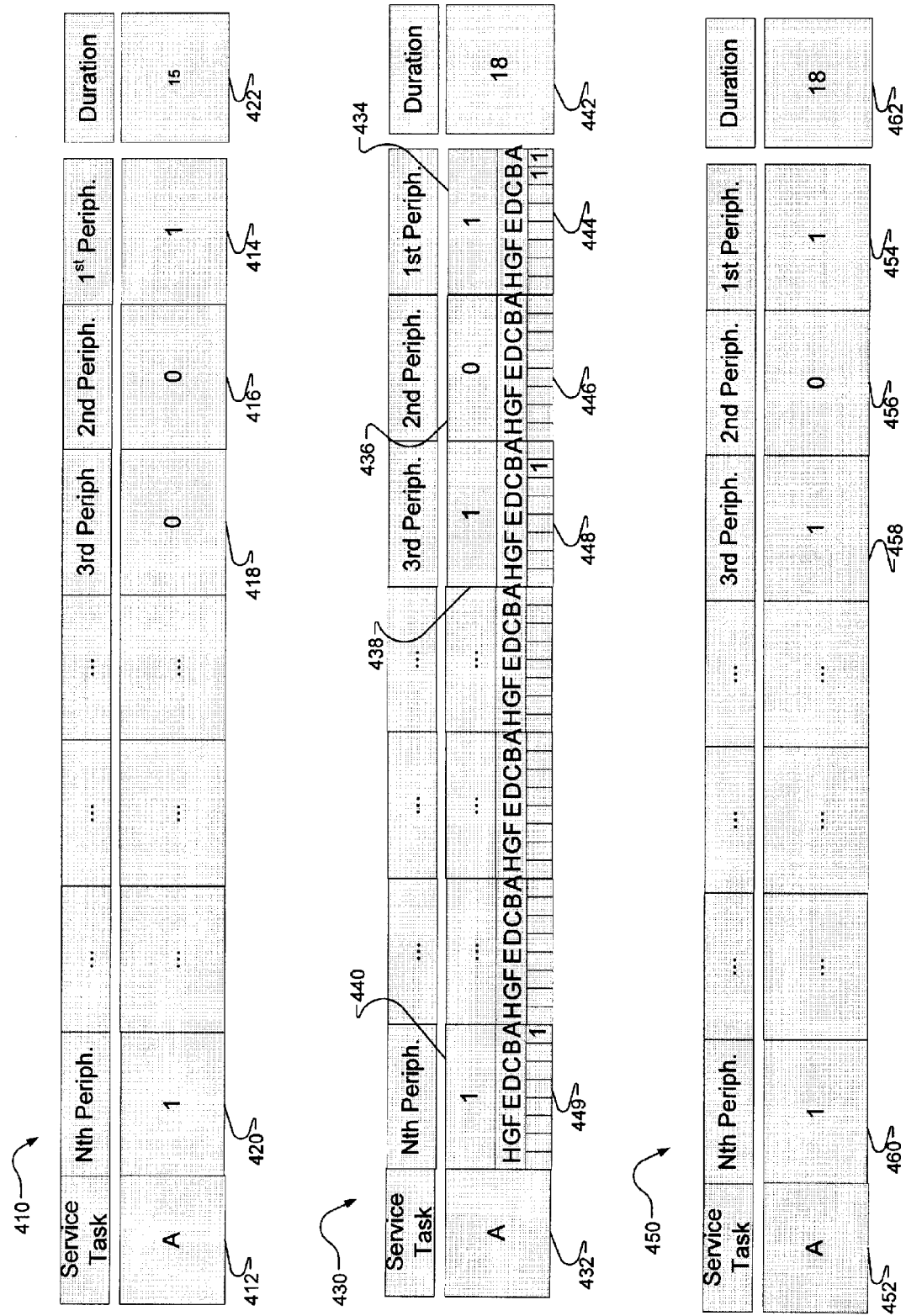
FIG. 4 is a drawing illustrating exemplary data structures utilized by the traffic control module.

In the embodiments described above, the traffic control module 320 receives an input message from an application, maintains a message history based on received messages, and generates an output message containing instructions to be executed by the second processor 312 based on the message history. FIG. 4 illustrates exemplary structures of an input message 410, an output message 450, and a message history 430.

An input message 410 is comprised of a service task identifier 412, a plurality of peripheral fields 414, 416, 418 and 420, and a duration field 422. The task identifier field 412 represents the task issuing the message. The set of tasks that can issue a message is a predetermined finite set representing all the tasks that can request one or more peripherals to be turned on, where each task is assigned a unique task identifier. Thus, the task field 412 will indicate which task issued the message. In the example, the input message is instructing the second processor to turn on the first and the Nth peripherals.

The peripheral fields 412, 414, 416, and 418 represent the instructions issued by the task, such that if a particular field has a 1 stored therein, then the task has requested that the peripheral device represented by the particular field be turned on for at least the amount of time indicated in the duration field 422. It is appreciated that each peripheral device or component that is controlled by the second processor 112 is represented by a peripheral field of the plurality of peripheral fields. In the example, the peripheral fields of the message history indicate that the first, third, and Nth peripherals are to be turned on.

The duration field 422 indicates an amount of time that the peripherals indicated in the peripheral fields are to remain on. It is appreciated that each task will require the second processor 112 to keep specific peripherals on for variable lengths of time. In the example of FIG. 4, a task A has requested that the second processor 112 turn the first peripheral and the Nth peripheral on for at least 15 seconds.

The message history 430 includes a plurality of peripheral fields 434, 436, 438, and 440 and a duration field 442. The message history may further include a task field 432 that indicates the task that issued the most recent instruction. In the message history 430, each peripheral field 434, 436, 438, and 440 has a corresponding task array 444, 446, 448, and 449, wherein each requesting task field indicates which particular tasks are currently requesting the corresponding peripheral to be set to on. Thus, the remaining task array 444, 446, 448, and 449 indicate the aggregation of tasks that have requested the corresponding peripheral to be set to on. For instance, in the example provided, the first peripheral has been requested to be set to on by task A and task B, while the third peripheral has been requested to be set to on by Task B only, and the Nth peripheral has been requested to be set to on by Task A only.

The duration field indicates the duration for the aggregated received messages, such that the duration indicates the longest remaining duration of all the received messages. For instance, if an older message requested that the duration be 18 seconds and a more recent message requests that the duration be set to 15 seconds, then the duration field will be set to 18 seconds. It is noted that the traffic control module 320 includes a timer that keeps track of a time remaining for the aggregated messages, wherein the timer is based on the duration indicated in the duration field 442 of the message history 430.

The output message 450 is comprised of a plurality of peripheral fields 454, 456, 458 and 460 and a duration field 462. Further, the output message 450 may include a task field 452. The traffic control module 320 will populate the peripheral fields 454, 456, 458 and 460 of the output message 450 based on the peripheral fields 442, 444, 446, and 448 of the message history 430. Thus, if a peripheral field 442, 444, 446, and 448 of the message history 430 is marked, then the corresponding peripheral field 454, 456, 458 and 460 of the output message 450 will be marked as well. The traffic control module 320 will also populate the duration field 462 of the output message 450 based on the value of the duration field 442 of the message history.

It is noted that the input message 410, output message 450, and the message history 430 can each be represented by a data structure with a task identifier element, an element representing which peripherals are to be turned on, and a duration value element. Further, in the message history, a peripheral element may include a requesting task array, where each element in the requesting task array represents one of the tasks that can be identified by a task identifier, and an element indicating whether the peripheral is to be turned on. Alternatively, the peripheral fields and the request task arrays can be represented by a string of bits, where the position of a bit corresponds to specific peripheral of the peripheral fields and to a specific task in the requesting task array.

Figure 5A:
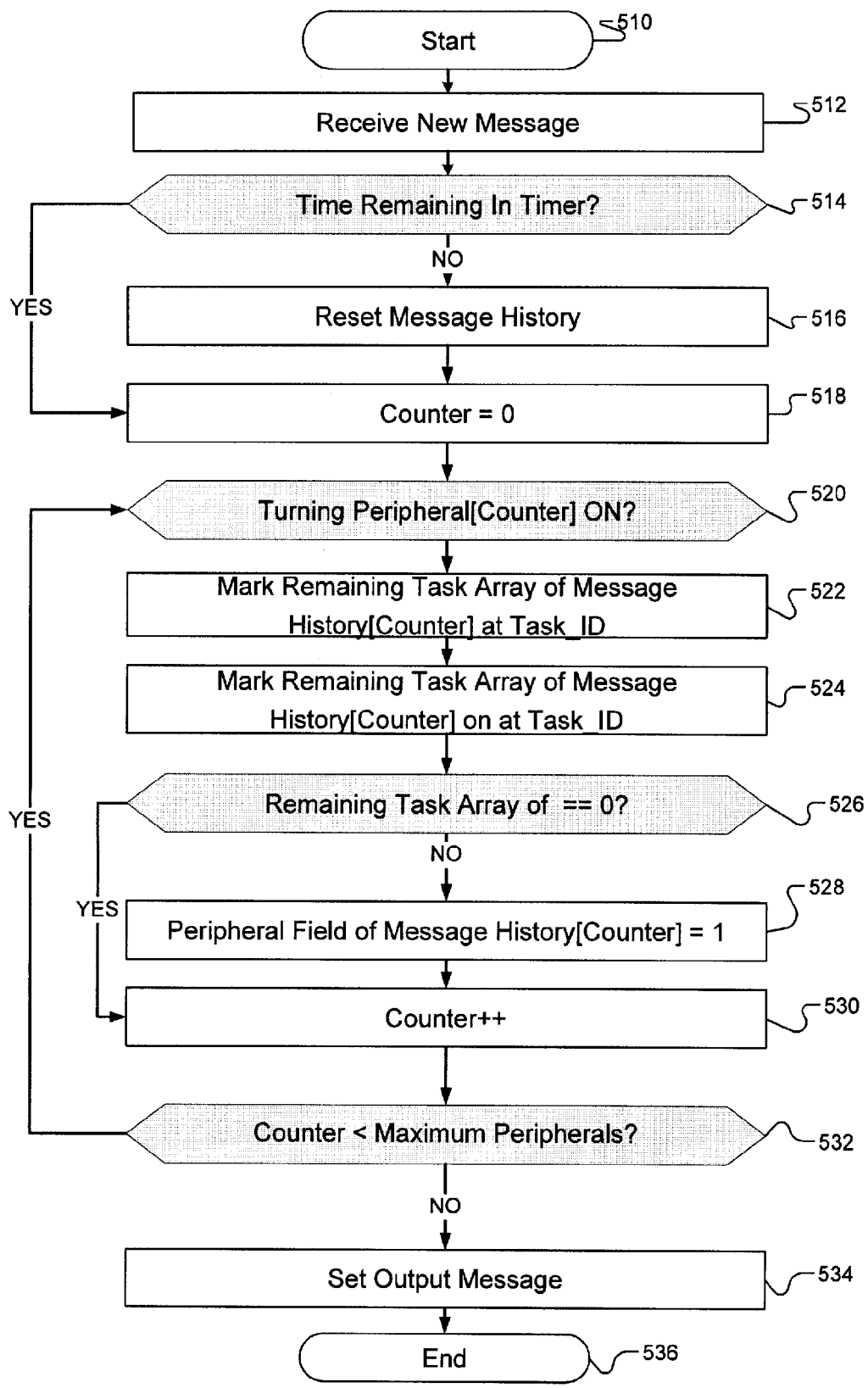
FIGS. 5A and 5B are flow charts illustrating an exemplary method that is executed by the traffic control module.
Figure 5B:
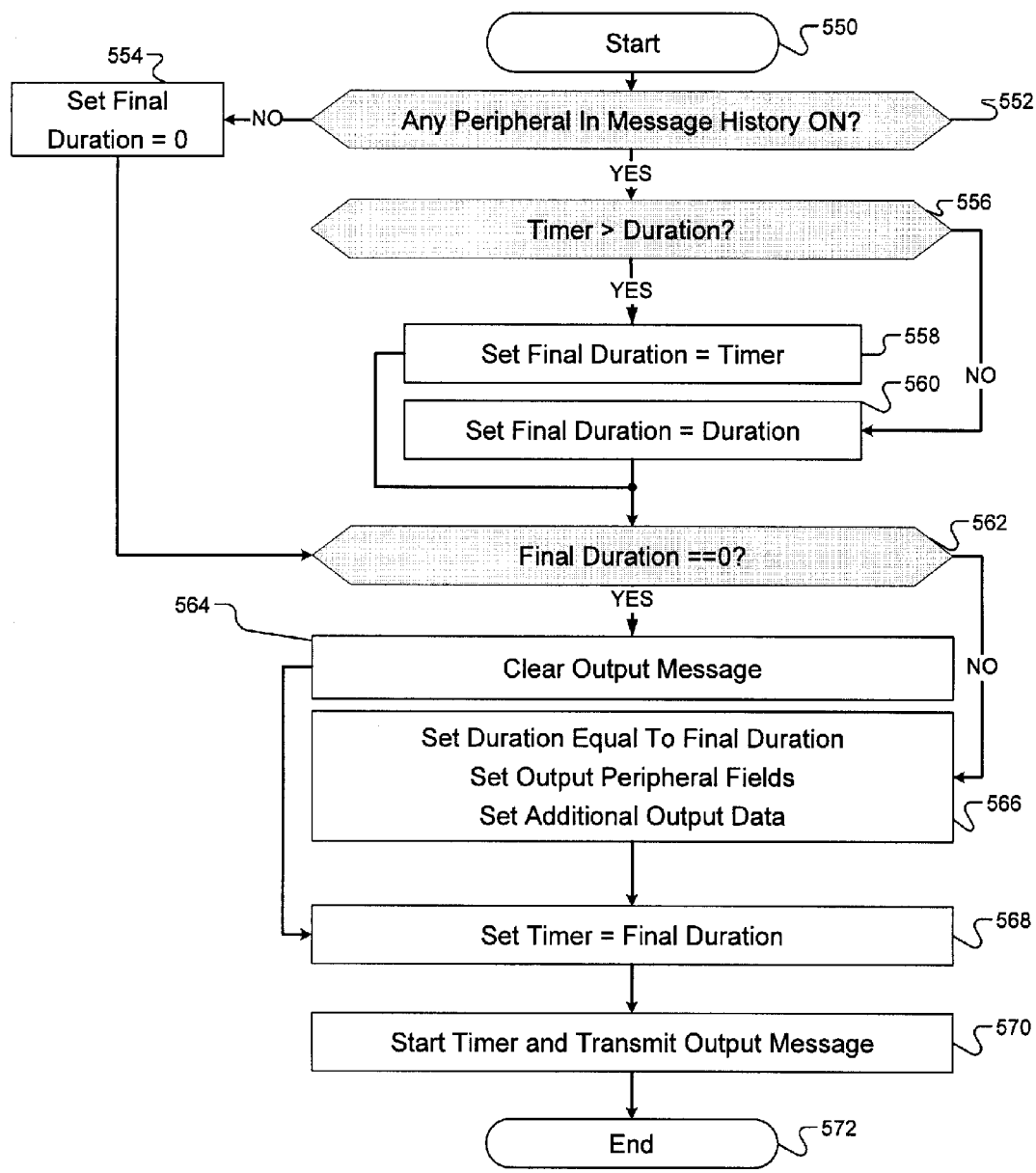

FIGS. 5A and 5B represent an exemplary method that may be executed by the traffic control module 320. The traffic control module 320 will receive an input message from an application executing a particular task, as shown at step 512. For instance, the GPS system may issue a set of instructions to be executed by the second processor 112, and will communicate the input message to the traffic control module 320. The received input message will include a task identifier that identifies the task issuing the message, a plurality of peripheral fields, each field indicating whether a designated peripheral should be turned on, and a duration indicating a minimum amount of time that the designated peripherals should be turned on. As was discussed above, the plurality of peripheral fields can be represented by a string of bits, where each bit location represents a particular peripheral device. For example, a string of 0101 indicates that the first and third peripherals are turned on and the second and fourth peripherals are off.

As mentioned above, the traffic control module 320 maintains a timer. The timer is used to determine how much time is remaining for the set of instructions being executed by the second processor 112. For example, if an output message is transmitted to the second processor 112 calling for a 10 second duration and the second processor 112 does not have a greater amount of time remaining from a previous message, the time is set to 10 seconds, such that the time begins to count down once the output message is transmitted to the second processor 112. When a new message is received from a task, the traffic control module 320 will determine whether the timer has any time remaining, as shown at step 514. If the timer has expired, then the message history is reset, as shown at step 516. The message history may be reset by clearing all values in the message history, i.e., setting all values to zero.

After the timer has been checked, the traffic control module 320 will determine if the received input message is turning any of the peripherals on. The traffic control module 320 will initialize a counter to 0, as shown at step 518. As described above, the fields of the peripherals can be arranged such that the relationship between the fields is predetermined, whereby the counter value is indicative of a particular peripheral field. The traffic control module 320 will then determine whether the received input message requests the peripheral device corresponding to the counter value is to be turned on, as shown at step 520. The traffic control module 320 can determine whether the bit corresponding to the counter value in the peripheral fields of the input message described above is set to one. This can be done by performing a bit shifting a 1 operation on which the 1 is shifted to the right by the value of the counter and performing an AND operation with the bit string representing the plurality of peripheral fields and the bit shifted value.

If the peripheral device being assessed is set to be turned on, then the traffic control module 320 will update the message history by setting the field of the peripheral device located at the value of the counter to a 1. Further, in the requesting task array, the task which issued the message is set to 1. The requesting task array can be a string of bits, where each bit represents a particular task. For instance, if the first task requested the corresponding peripheral to be set to 1, the requesting task array is set to 0000001. The requesting task array can be set by forcing the bit corresponding to the task identifier in the requesting task array to a 1 value.

If the received input message does not request the peripheral device being assessed to be turned on, the traffic control module 320 will set the bit corresponding to the task identifier in the requesting task array to 0, as shown at step 524.

The traffic control module 320 will analyze the message history of the peripheral field corresponding to the counter value to determine whether any task is requesting that the peripheral device being assessed be set to on, as shown at step 526. This can be achieved by checking the value of the requesting task array. If the value of the requesting task array is not zero, i.e. at least one bit in the requesting task array is set to 1, then the peripheral field of the message history is updated to indicate that the peripheral device being assessed is to be turned on or is to remain on, as shown at step 528. If the peripheral device being assessed is to be turned off or remain off, i.e. the value of the requesting task array is equal to zero, then the peripheral field of the peripheral being assessed is set to 0 in the message history. In either case, the traffic control module 320 will update the counter, as shown at step 530, and check whether more peripheral fields need to be assessed, as shown at step 532. If there are more peripherals to be analyzed remaining, the traffic control module 320 returns to step 520. When all the peripheral fields have been analyzed, then the traffic control module 320 will generate the output message, as shown at step 534.

It is appreciated that the foregoing is an example of a method that may be executed by the traffic control module 320 and that variations of the foregoing may also be implemented. Furthermore, it is appreciated that some of the steps described above may be performed in multiple steps, while other steps described above can be combined into a single step.

Once the input message is analyzed and the requesting peripheral tasks of the message history are set, the traffic control module 320 will set the values of the output message. FIG. 5B illustrates an exemplary method for setting the output message. The traffic control module 320 will first check to determine whether any of the peripheral devices are to be turned on or are to remain on, as shown at step 552. This can be done by assessing the peripheral fields of the message history. If all of the peripheral fields in the message history are set to 0, then the output duration is set to 0, as shown at step 554.

If there are peripherals to be turned on or to remain on, then the traffic control module 320 will set the output duration value. The output duration is set equal to either the duration received in the input message or to the remaining amount of time in the timer, whichever value is greater. Thus, the traffic control module 320 will determine whether the value of the duration received in the input message is greater than the timer value, as shown at step 556. If the timer value is greater than the received duration value, then the output duration is set to the value of the timer, as shown at step 558. If the received duration value is greater than the timer value, then the traffic control module 320 will set the output duration equal to the received duration value, as shown at step 560.

Once the output duration is set, the traffic control module 320 will determine whether the output duration is equal to 0, as shown at step 562. If the output duration is equal to 0, i.e., no peripherals are to be turned on or are to remain on, then the values of the output message are cleared, as shown in step 564. The output message is cleared by setting all the values of the peripheral fields of the output message and the duration field of the output message to 0.

If the output duration is greater than 0, i.e., at least one peripheral is to be turned on or to remain on, then the values of the outgoing message are set, as shown at step 566. The outgoing message will include a plurality of outgoing peripheral fields. The traffic control module 320 will set the duration field of the output message equal to the output duration, the determination of which was described above. The traffic control module 320 will set the peripheral fields of the output message equal to the peripheral fields of the message history. It is appreciated that the peripheral fields of the output message may be a string of bits, where each bit represents a particular peripheral. In these instances, the peripheral fields of the output message can be set by copying the string of bits representing the peripheral fields of the message history. The traffic control module 320 may set any other additional data in the message history, as required by the second processor 112. For instance, the traffic control module 320 may populate a task field in the output message indicating a task that provided the received input message. Once the values of the output message are sent, a timer is set equal to the value of the final duration, as shown at step 568. The output message is then communicated to the second processor 112, and the timer is started, as shown at step 570.

It is appreciated that the foregoing is an example of a method that may be executed by the traffic control module 320 and that variations of the foregoing may also be implemented. Furthermore, it is appreciated that some of the steps described above may be performed in multiple steps, while other steps described above can be combined into a single step.

As can be appreciated from the foregoing, the message history is used to determine an aggregate list of all the tasks that have requested specific peripherals to be turned on or to remain on. Further, the message history keeps track of the duration of all of the instructions. By maintaining a message history, the traffic control module 320 can efficiently generate messages on behalf of all the running applications on the first processor 110.

The following description is merely illustrative in nature and is in no way intended to limit the disclosure, its application, or uses. For purposes of clarity, the same reference numbers will be used in the drawings to identify similar elements. It should be understood that steps within a method may be executed in different order without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors or a group of execution engines. For example, multiple cores and/or multiple threads of a processor may be considered to be execution engines. In various implementations, execution engines may be grouped across a processor, across multiple processors, and across processors in multiple locations, such as multiple servers in a parallel processing arrangement. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A system configured to control messaging traffic between a first processor and a second processor comprising:
   the first processor being configured to perform a plurality of predetermined tasks, each task assigned a unique task identifier, and to generate an input message on behalf of one of the plurality of tasks, wherein the input message includes input instructions for the second processor for controlling one or more peripheral devices of the system and an input duration indicating a minimum amount of time that the input instructions to the second processor are to be executed;
   a message control module being configured to receive an input message intended for the second processor from the first processor and to maintain a message history based on the received input message and previously received input messages, wherein the message history indicates which peripheral devices of the system are to be on and which tasks of the plurality of tasks requested the peripheral devices to be on, and to generate an output message that includes output instructions for the second processor based on the message history and an output duration based on the message history; and
   the second processor being configured to receive the output message and to execute the output instructions for an amount of time corresponding to the output duration.

2. The system of claim 1 wherein the message history includes a plurality of peripheral fields, wherein each peripheral field corresponds to one of the peripheral devices, such that when a peripheral device is to be on, the peripheral field indicates that the peripheral device is to be on.

3. The system of claim 2 wherein each peripheral field has a requesting task array associated therewith, wherein a particular requesting task array of a particular peripheral field indicates which predetermined tasks of the plurality of predetermined tasks are currently requesting a particular peripheral device of the particular peripheral field to be on, wherein each element of the particular task array corresponds to a different predetermined task of the plurality of predetermined tasks.

4. The system of claim 3 wherein if one or more of the elements of the particular task array are currently requesting the particular peripheral device to be on, then the particular peripheral field indicates that the particular peripheral device is to be on.

5. The system of claim 1 further comprising a timer that indicates an amount of time remaining for a most recently received output message, wherein the timer is updated when a new output message is received by the second processor.

6. The system of claim 5 wherein the traffic control module determines which of the amount of time remaining indicated by the timer and the input duration is greater in value and sets the output duration equal to the greater value.

7. The system of claim 5 wherein when the traffic control module sets all values in the message history to indicate that the peripheral devices are off when the timer indicates there is no time remaining.

8. A method for controlling message traffic between a first processor and a second processor, wherein the second processor controls one or more peripheral devices on behalf of a plurality of predetermined tasks being executed by the first processor, the method comprising:
   receiving an input message originating from one of the plurality of tasks executing on the first processor intended for the second processor, wherein the input message includes input instructions for the second processor for controlling one or more of the peripheral devices and an input duration indicating a minimum amount of time that the input instructions to the second processor are to be executed;
   maintaining a message history based on the received input message and previously received input messages, wherein the message history indicates which peripheral devices of the system are to be on, which tasks of the plurality of tasks requested the peripheral devices to be on, and
   generating an output message that includes output instructions for the second processor based on the message history and an output duration based on the message history; and
   transmitting the output message to the second processor.

9. The method of claim 8 wherein the message history includes a plurality of peripheral fields, wherein each peripheral field corresponds to one of the peripheral devices, such that when a peripheral device is to be on, the peripheral field indicates that the peripheral device is to be on.

10. The method of claim 9 wherein each peripheral field has a requesting task array associated therewith, wherein a particular requesting task array of a particular peripheral field indicates which predetermined tasks of the plurality of predetermined tasks are currently requesting a particular peripheral device of the particular peripheral field to be on, wherein each element of the particular task array corresponds to a different predetermined task of the plurality of predetermined tasks.

11. The method of claim 10 further comprising marking the particular peripheral field to indicate that the particular peripheral device is to be on when one or more of the elements of the particular task array are currently requesting the particular peripheral device to be on.

12. The method of claim 8 further comprising maintaining a timer that indicates an amount of time remaining for a most recently received output message.

13. The method of claim 12 further comprising updating the timer when a new output message is transmitted to the second processor.

14. The method of claim 12 further comprising determining which of the amount of time remaining indicated by the timer and the input duration is greater in value and setting the output duration equal to the greater value.

15. The method of claim 12 further comprising setting all values in the message history to indicate that the peripheral devices are off when the timer indicates there is no time remaining.

* * * * *